United States Patent [19]

Swann et al.

[11] Patent Number: 5,507,890
[45] Date of Patent: Apr. 16, 1996

[54] MULTIPLE LAYERED GAS GENERATING DISK FOR USE IN GAS GENERATORS

[75] Inventors: Timothy A. Swann, Schwaebisch Gmuend, Germany; Eldron L. Boehmer, Mesa, Ariz.

[73] Assignee: TRW Inc., Lyndhurst, Ohio

[21] Appl. No.: 243,988

[22] Filed: May 17, 1994

Related U.S. Application Data

[63] Continuation-in-part of Ser. No. 894,761, Jun. 5, 1992, abandoned.

[51] Int. Cl.[6] .................................................. C06B 45/16
[52] U.S. Cl. ........................... 149/16; 149/14; 149/15; 149/35
[58] Field of Search .................... 149/14, 15, 16, 149/35

[56] References Cited

U.S. PATENT DOCUMENTS

| | | | |
|---|---|---|---|
| Re. 32,584 | 1/1988 | Pintz | 149/35 |
| 3,194,851 | 7/1965 | Sauer et al. | 149/2 |
| 3,549,436 | 12/1970 | La Rocca | 149/14 |
| 3,722,421 | 3/1973 | Thrailkill et al. | 149/15 |
| 3,880,595 | 4/1975 | Timmerman | 149/15 |
| 3,883,373 | 5/1975 | Sidebottom | 149/35 |
| 3,926,697 | 12/1975 | Humbert et al. | 149/14 |
| 3,995,559 | 12/1976 | Brice et al. | 149/15 |
| 4,244,758 | 1/1981 | Garner et al. | 149/35 |
| 4,258,287 | 7/1988 | Dietz | 149/35 |
| 4,339,288 | 7/1982 | Camp | 149/35 |
| 4,390,380 | 6/1983 | Camp | 149/35 |
| 4,533,416 | 8/1985 | Poole | 149/35 |
| 4,696,705 | 9/1987 | Hamilton | 149/35 |
| 4,698,107 | 10/1987 | Goetz et al. | 149/35 |
| 4,806,180 | 2/1989 | Goetz et al. | 149/35 |
| 4,834,818 | 5/1989 | Kazumi et al. | 149/35 |
| 5,143,567 | 9/1992 | Taylor et al. | 149/35 |

FOREIGN PATENT DOCUMENTS

| | | |
|---|---|---|
| 0586045A2 | 3/1994 | European Pat. Off. . |
| 0586060A2 | 3/1994 | European Pat. Off. . |
| 267982 | 1/1982 | Japan . |

*Primary Examiner*—Donald P. Walsh
*Assistant Examiner*—Anthony R. Chi
*Attorney, Agent, or Firm*—Tarolli, Sundheim & Covell

[57] ABSTRACT

The present invention resides in a body of material which is ignitable to generate a gas for inflating an air bag. The body of material comprises at least two layers of ignitable gas generating material which are pressed together. One of the layers comprises a nitrogen generating composition which is easily ignited and burns rapidly. The other of the layers comprises a nitrogen generating composition which is less easily ignited and burns less rapidly than the one layer.

22 Claims, 5 Drawing Sheets

MULTIPLE LAYERED GAS GENERATING DISK FOR USE IN GAS GENERATORS

RELATED APPLICATION

This application is a continuation-in-part of prior application Ser. No. 07/894,761, filed Jun. 5, 1992, now abandoned, by the inventors herein, entitled "Multiple Layered Gas Generating Disk for Use in Gas Generators", and assigned to the assignee of the present application.

BACKGROUND OF THE INVENTION

1. Technical Field

The present invention relates to a body of material which is ignitable to generate gas to inflate an air bag. The body is made of a plurality of layers of gas generating material which are pressed together.

2. Description of the Prior Art

U.S. Pat. No. 3,194,851 discloses a propellant grain made of a plurality of layers of gas generating material. The propellant grain is used in small arms ammunition. The outer layer is a cool burning propellant to prevent gun barrel erosion. The intermediate core of the grain is characterized as a high energy material.

U.S. Pat. No. 4,698,107 discloses a nitrogen gas generating grain suitable for inflating an air bag for a vehicle. The grain has an ignition enhancing coating. The coating is applied to the grain from a solvent-based solution or suspension. This requires that the grain be dried or cured after application of the coating.

U.S. Pat. No. 3,649,045 discloses a multi-stage pyrotechnic gas generator. Each stage has a primary pyrotechnic charge and a secondary pyrotechnic charge. The secondary pyrotechnic charge is an annular ring encompassing the primary pyrotechnic charge. The secondary pyrotechnic charge functions to provide a cooling effect on the temperature of the gas generated by the primary charge.

U.S. Pat. No. 3,880,595 discloses a gas generator for inflating a bag. The generator comprises a vessel containing alternate layers of a propellant composition and an endothermic cooling composition.

SUMMARY OF THE INVENTION

The present invention resides in a body of material which is ignitable to generate a gas for inflating an air bag. The body of material comprises at least two layers of ignitable gas generating material which are pressed together. One of the layers comprises a nitrogen generating composition which is easily ignited and burns rapidly. The other of the layers comprises a nitrogen generating composition which is less easily ignited and burns less rapidly than the one layer.

A preferred gas generating material in each of the layers of the body of material is an azide and an oxidizer. A preferred oxidizer in the more rapidly burning composition is copper oxide. A preferred oxidizer in the less rapidly burning composition is iron oxide.

In one embodiment of the present invention, the body of material comprises three layers, an intermediate layer sandwiched between two outer layers. The intermediate layer comprises a nitrogen generating composition which is more easily ignited and burns more rapidly than the composition of the outer layers. The outer layers comprise a nitrogen generating composition which is less easily ignited and burns less rapidly than the composition of the intermediate layer.

Preferably, the body of material is cylindrical and in the form of a disk or pellet with the layers extending transverse to the axis of the disk or pellet.

In another embodiment of the present invention, the body of material comprises at least two layers of gas generating material, and each layer of gas generating material has a thickness sufficient to contribute to the sustained burn of the body of material. The thickness of one layer relative to any other layer is in the range of 20:80 to 80:20.

In still another embodiment of the present invention, the less rapidly burning material forms a sinter on burning, and the more rapidly burning material, on burning, forms a molten metal which plates on the sinter of the less rapidly burning material.

The present invention also resides in an apparatus for protecting a vehicle occupant during a collision. The apparatus comprises an air bag and means for inflating the air bag including ignitable gas generating material. The ignitable gas generating material comprises at least one body of gas generating material. Each body of gas generating material comprises at least two layers of gas generating material. One of the layers comprises a nitrogen generating composition which is easily ignited and burns rapidly. The other of the layers comprises a nitrogen generating composition which is less easily ignited than the one layer and burns less rapidly than the one layer. The thickness of one layer relative to any other layer is in the range of 20:80 to 80:20. Alternatively, the body of material comprises three layers in a sandwich construction in which the intermediate layer is the nitrogen generating composition which is easily ignited and burns rapidly and the outer layers are the nitrogen generating composition which is less easily ignited and burns less rapidly.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

For purposes of the present application, a "layer" is defined as a stratum having opposed, distinct surfaces. A coating, in contrast, does not have opposed, distinct surfaces.

Figure 1:
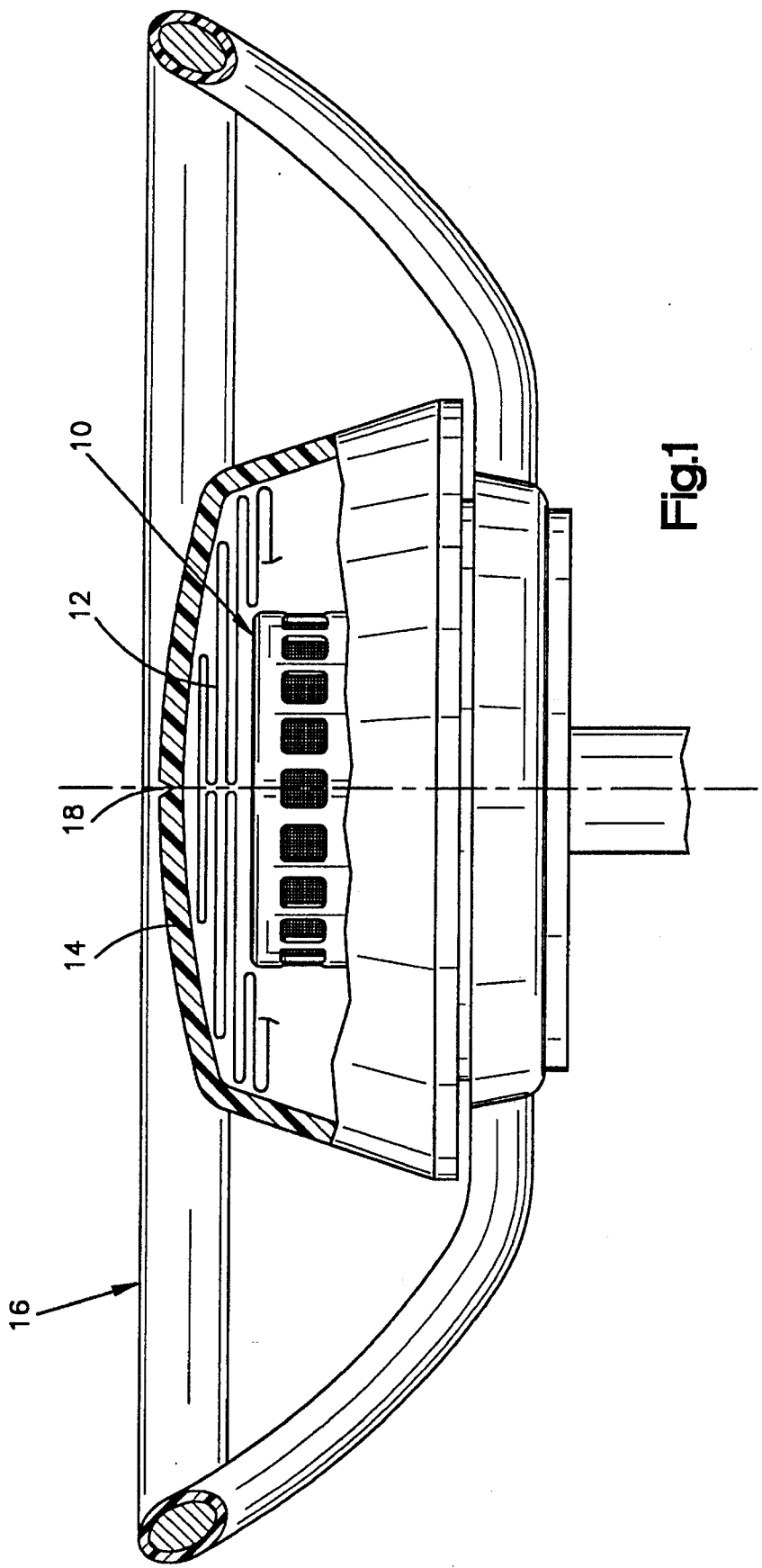
FIG. 1 is a transverse view, partially in section, of a vehicle steering wheel with an inflatable occupant restraint module including an inflator for inflating a vehicle air bag.

The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 form a module which is mounted on a vehicle steering wheel 16.

Upon the occurrence of a sudden vehicle deceleration, such as occurs in a collision, the inflator 10 is energized and produces a large volume of gas. The flow of gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion chamber side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of materials to be described which when ignited generate nitrogen gas. Instead of relatively large disks 110, smaller pellets, similar in size and shape to an aspirin tablet, can be used. For purposes of the present application, the term "disks" includes pellets.

An annular prefilter 120 is disposed in the canister 90. The prefilter 120 is located radially outward of the gas generating disks 110 and inside the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. An annular filter shield 126 projects radially inwardly from the diffuser cup side wall 50 and separates the final filter assembly 124 and the slag screen 122. The filter shield 126 is secured to the diffuser cup side wall 50 by an interference fit.

The inflator 10 includes an initiator assembly 140. The initiator assembly 140 includes the igniter 142 which projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The igniter 142 includes a pair of wire leads 146 which extend outwardly from the initiator assembly 140. The wire leads 146 are connectable to a collision sensor (not shown).

Inside the igniter 142, the wire leads 146 are connected to a resistance wire embedded in an ignition material. A thin plastic film (not shown) is located on the outside of the upper portion of the igniter 142, to prevent metal-to-metal contact which could ground the igniter 142 and disable the inflator 10. The igniter 142 may be of any suitable well known construction.

Upon the occurrence of a collision or other sudden vehicle deceleration, the collision sensor closes an electrical circuit. An electrical current then flows through the wire leads 146 to the igniter 142. The resistance wire heats and ignites the igniter 142. Ignition of the igniter 142 forms hot gas products which flow outwardly from the igniter 142 and rupture the inner side wall 98 of the canister 90. The hot gas from the igniter 142 ignites the disks 110 of gas generating material. The disks 110 of gas generating material rapidly produce a large volume of gas.

The gas pressure acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some coarse particulates and other combustion products of the initiator assembly 140 and of the gas generating disks 110. The prefilter 120 also cools the gas, and molten combustion products plate on the prefilter. The gas flows through the openings 68 and into the slag screen 122.

The slag screen 122 removes and traps particles from the flowing gas. The slag screen also cools the flowing gas. As the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Figures 3, 4:
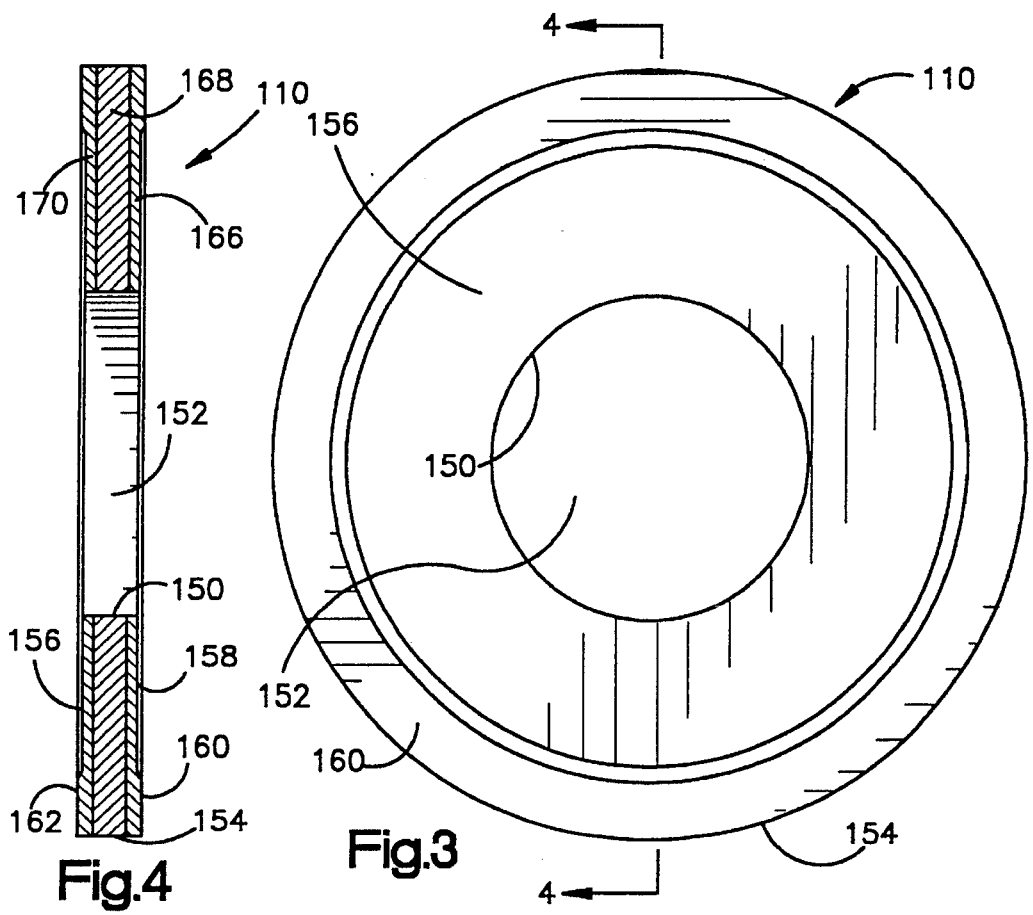
FIG. 3 is a plan view of a disk of gas generating material in accordance with one embodiment of the present invention.
FIG. 4 is a sectional view taken along line 4—4 of the disk of FIG. 3.

Referring to FIGS. 3 and 4, the gas generating disks 110 have a generally flat, toroidal configuration. An inner cylindrical surface 150 defines a central hole 152 through the disk. The disk has an outer cylindrical surface 154 which is coaxial with the inner cylindrical surface 150. An upper generally planar surface 156 extends radially between the inner and outer surfaces 150, 154. A lower generally planar surface 158, spaced from and generally parallel with surface 156, also extends radially between the inner and outer surfaces 150, 154. Both planar surfaces 156, 158 have annular raised areas 160, 162 contiguous with the outer cylindrical surface 154.

Figure 2:
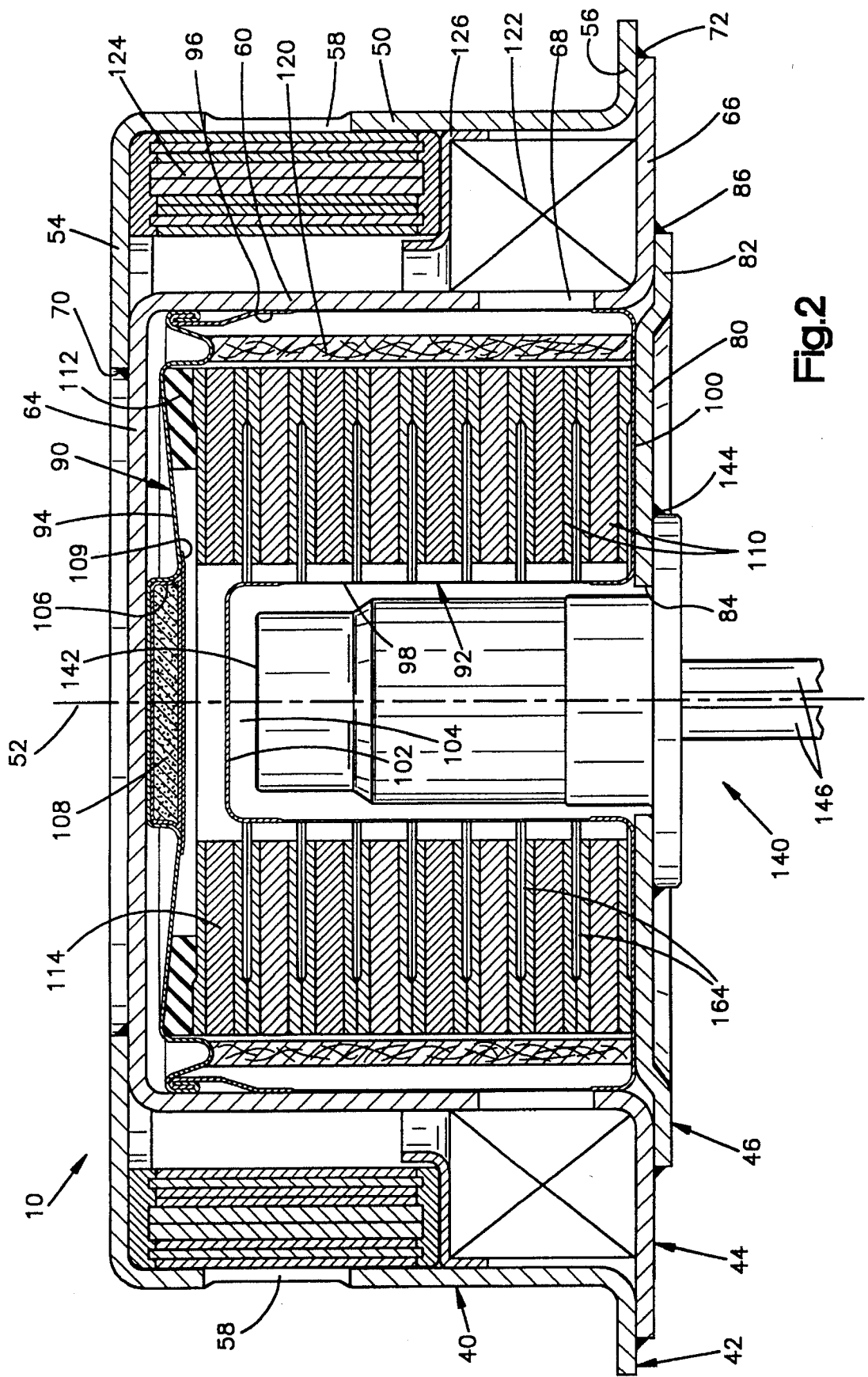
FIG. 2 is a transverse view, partially in section, of the inflator of FIG. 1, the inflator comprising a plurality of gas generating disks constructed in accordance with the present invention.

As shown in FIG. 2, the disks 110 are arranged in a stack within the canister 90, with the holes 152 of the disks being aligned to accommodate the initiator assembly 140. In the embodiment of the present invention illustrated in FIG. 2, the stack is comprised of eight disks.

The raised areas 160, 162 of the disks maintain the remainder of the adjacent planar surfaces 156, 158 of adjacent disks in a slightly spaced-apart relationship, defining air spaces 164 (FIG. 2) between the disks. These air spaces expose a maximum amount of surface area of each disk for burning.

If desired, the air spaces 164 can be filled with particles of gas generating material (not shown), loosely packed into the air spaces 164. The air between the particles of gas generating material is sufficient to support burning of the disks 110. At the same time, the particles of gas generating material provide a substantially continuous phase of gas generating material longitudinally within the canister 90. Such gas generating particles ensure a more instantaneous ignition of all of the disks, and also cushion each disk from shock and vibration.

A variety of compositions, well known to those skilled in the art, can be utilized as the gas generating material of disks 110. A preferred gas generating material is a mixture of an alkali metal azide and an oxidizer. A preferred oxidizer is a metal oxide, as disclosed in U.S. Pat. No. 3,895,098 to Pietz. A preferred alkali metal azide is sodium azide. Other azides, such as lithium azide, can also be used. Examples of metal oxides that can be used are copper oxide, iron oxide, stannic oxide, titanium dioxide, lead oxide, chromium oxide, zinc oxide, manganese oxide, and nickel oxide. Non-metallic oxidizers, which are usable with azides, can also be used. Examples of such oxidizers are sodium nitrate, potassium nitrate, potassium perchlorate, sodium sulphate, and sodium sulphite.

Preferably, the amount of metal oxide used is at least a stoichiometric amount, based on the amount of alkali metal azide used. The gas generating material can also comprise amounts of other ingredients, such as an oxidant. Examples of suitable oxidants are potassium perchlorate and sodium nitrate. The composition can also comprise a binder, such as clay, and strengthening fibers, such as graphite fibers. However, normally, such other ingredients are not required.

Figures 7, 8:
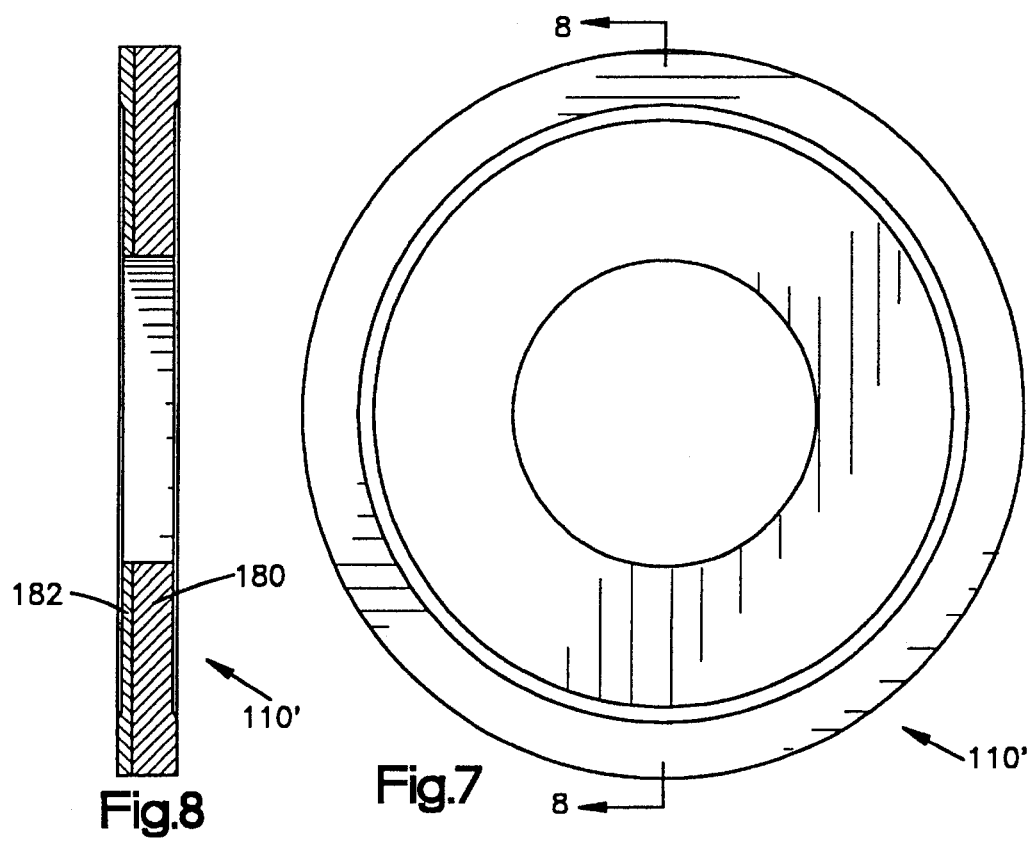
FIG. 7 is a plan view of a disk of gas generating material in accordance with another embodiment of the present invention.
FIG. 8 is a sectional view taken along line 8—8 of the disk of FIG. 7.

In the practice of the present invention, the cylindrical gas generating disks 110 are made up of at least two layers of gas generating material. FIGS. 3 and 4 show a gas generating disk 110 with three layers 166, 168, and 170. FIGS. 7 and 8 show a gas generating disk 110' with two layers 180, 182. In the embodiments, of FIGS. 3 and 4, and FIGS. 7 and 8, the layers of gas generating material (166, 168, 170 and 180, 182, respectively) extend transverse to the central axis of both the disk and cylindrical surfaces 150 and 154.

One layer preferably has a thickness which is at least one-fourth of the thickness of any other layer. Thus, each layer contributes to the sustained burn of the disk. In the embodiment of FIGS. 3 and 4, the outer layers 166, 170 have a thickness which is about one-third the thickness of the intermediate layer 168. In the embodiment of FIGS. 7 and 8, one layer 182 has a thickness about one-fourth the thickness of the other layer 180.

As will be described in the following Examples, each of the layers 166, 168, 170 and 180, 182 of the disks 110, 110' comprises, as the gas generating material, an alkali metal azide and a metal oxide. However, in both of the embodiments of FIGS. 3 and 4, and of FIGS. 7 and 8, at least one of the layers is a nitrogen generating composition which is easily ignited and burns rapidly, and at least one other of the layers is a nitrogen generating composition which is less easily ignited and burns less rapidly than the one layer.

Making a layer which is easily ignited and burns rapidly, or alternatively one which is less easily ignited and burns less rapidly, can be achieved by selecting a particular metal oxide to be blended with the alkali metal azide in the nitrogen gas generating composition. Byway of example, cupric oxide (CuO) having an average particle size of 10 microns, blended with sodium azide, ground to an average particle size of 17 microns, in the weight ratio of 61% sodium azide to 39% cupric oxide, has a relatively fast burning rate of about 1.76 inches per second (at 1,000 psi), and a relatively high heat of reaction of about 342 calories per gram. In contrast, iron oxide ($Fe_2O_3$), having an average particle size of one micron, blended with the same sodium azide, in the weight ratio of 68% sodium azide to 32% iron oxide, has a relatively slow burning rate of about 0.5 inch per second (at 1,000 psi), and a relatively low heat of reaction of about 278 calories per gram.

The above burning rates were obtained using the conventional strand burning method. A pressed strand of ⅜" diameter and ½" length is ignited, at one end, in a bomb at 1,000 psi. Outside diameter burning is inhibited. The burning rate is determined from a bomb pressure trace, the lapse of time from the start to end of pressure increase being the burn time.

Thus, referring to FIGS. 3 and 4, the intermediate layer 168 of gas generating material in each disk 110 is a relatively easily ignited and fast burning material comprising a metal oxide such as copper oxide, and the outer layers 166, 170 of the gas generating material, in each disk 110, are relatively less easily ignited and slower burning, comprising a metal oxide such as iron oxide.

In the embodiment of FIGS. 7 and 8, either layer 180, 182 can be a relatively easily ignited and fast burning material, and either layer can be a less easily ignited and slower burning material.

The following Examples illustrate the present invention in more detail.

EXAMPLE 1

Referring to FIGS. 3 and 4, the disk 110 comprises the three layers 166, 168 and 170. Each layer is of substantially uniform thickness throughout. The outer layers 166 and 170 have a thickness of about 0.6 mm each. The intermediate layer 168 has a thickness of about 1.8 mm. The disk 110 has an overall thickness of about 3.3 mm, an outside diameter of about 55.3 mm, and an inside diameter of about 23.27 mm. The weight of the gas generating material in the disk is about 11.4 grams. The disk annular raised areas 160, 162 have a thickness of about 0.15–0.21 nun, and an annular width of about 2.67 mm.

The intermediate layer 168 has a different composition than the outer layers 166, 170, as mentioned above. Specifically, the outer layers 166, 170 are of a relatively slow-burning blend of sodium azide and iron oxide ($Fe_2O_3$) in the weight ratio of 68% sodium azide to 32% iron oxide. The intermediate layer 168 is a relatively fast-burning blend of sodium azide and cupric oxide (CuO), in the weight ratio of 61% sodium azide to 39% cupric oxide. In both compositions, the sodium azide is ground to an average particle size of about 17 microns. The iron oxide has an average particle size of one micron. The cupric oxide has an average particle size of about ten (10) microns.

A plurality of disks 110 were made into the toroidal configuration of FIGS. 3 and 4 by filling a lower half of a die, on the bottom of the die, with a layer of particles of the slow-burning gas generating material. A layer of the fast-burning gas generating material was then placed in the die half, on top of the first layer. Then the top layer of slow-burning gas generating material was placed in the die half on top of the intermediate layer. The upper die half was then brought downwardly against the layers of the gas generating material, pressing and compacting the particles of gas generating material into the toroidal configuration, as shown in FIGS. 3 and 4.

A gas generator having a configuration similar to the generator of FIG. 2 was loaded with eight (8) of the gas generating disks of FIGS. 3 and 4. The gas generator was fitted with a tank (not shown in FIG. 2) to receive the gas flow from the generator. The tank was fitted with a pressure gauge to measure pressure within the tank. In addition, a pressure gauge was also fitted to the gas generator to measure the pressure inside of the combustion cup 44. These pressures will be referred to, in this Example, and in Example 2, as the "tank" pressure and "combustor" pressure, respectively.

Figure 5:
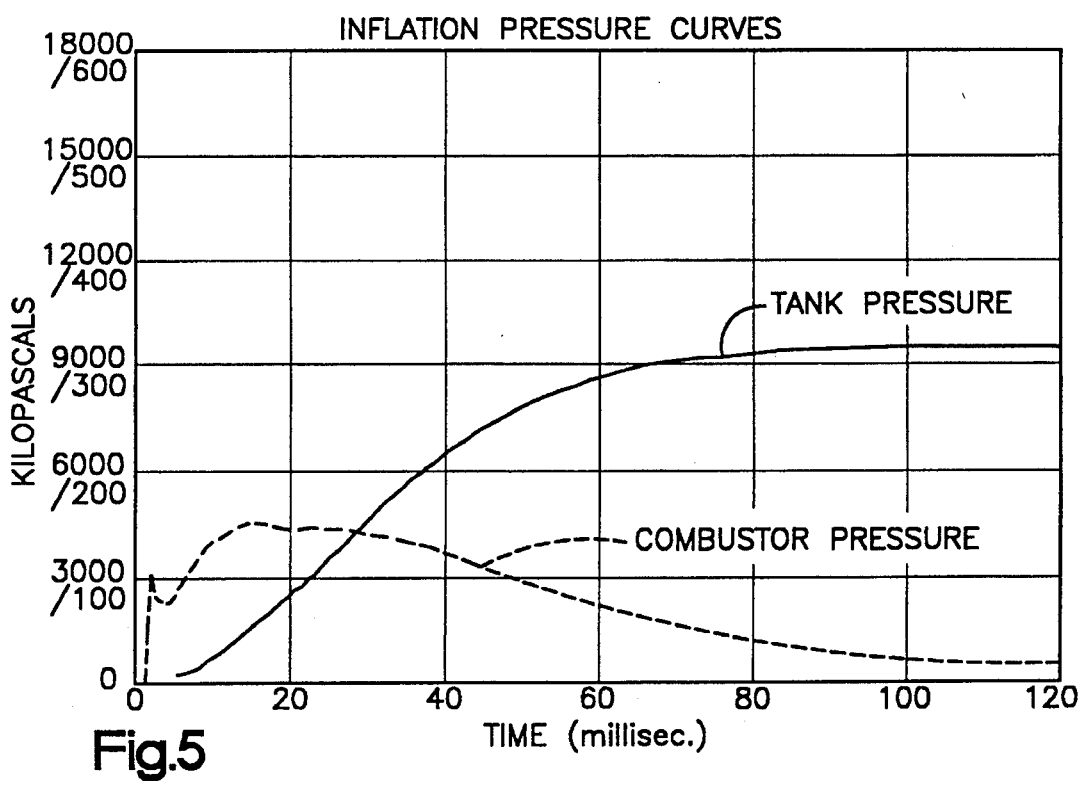
FIG. 5 is a graph showing pressure curves obtained in a test using the disks of gas generating material of FIG. 3.

FIG. 5 shows the burn characteristics of the disks of FIGS. 3 and 4. FIG. 5 has two curves, a combustor pressure curve (pressure within combustion cup 44) shown in the dashed line, and a tank pressure curve, shown as a solid line. In FIG. 5, two sets of values are given along the vertical side of the graph. The upper set of values is for the combustor pressure. The lower set of values is for the tank pressure. Referring to the combustor pressure curve (the dashed line), the pressure increased rapidly to a pressure of about 3,000 kPa. This rapid initial pressure increase was due to the combustion of the outer layers 166 and 170 of disks 110. The combustor pressure then dropped slightly, to about 2,850 kPa due to the release of gas from the combustion cup 44 into the receiving tank. At about five milliseconds, the combustion of the intermediate layer 168 of cupric oxide became established generating more gas than released, and the combustor pressure then increased, at a slope of about 45°, reaching a peak pressure of about 4,548 kPa at about 15.3 milliseconds of burn time. The combustor pressure then began to decline as the rate of escape of gas from the combustion cup 44 exceeded the rate of production of gas.

This burn characteristic is reflected in the tank pressure shown in the solid line of FIG. 5. The rise in the tank pressure started at about five milliseconds, corresponding with the release of gas from the combustor cup 44. In the initial few milliseconds, the tank pressure increased slowly, requiring 3.05 milliseconds to reach 1% of peak pressure. The tank pressure then increased at a more rapid rate achieving about 95% of peak pressure at 65 milliseconds. The rate of increase then declined to a peak tank pressure of about 316 kPa at about 106.25 milliseconds. This gave an S-shaped tank pressure curve as shown in FIG. 5. The following Table 1 gives specific tank pressures at specific burn times:

TABLE 1

| Milliseconds | Tank Pressure (kPa) |
| --- | --- |
| 5 | 7.5 |
| 10 | 26.4 |
| 20 | 88.1 |
| 30 | 156.1 |
| 40 | 217.7 |
| 50 | 260.9 |
| 60 | 287.7 |
| 70 | 302.7 |

The burning disks provided a maximum tank gas temperature of about 383° F.

The burn characteristics of the disks 110 were compared with the conventional burn characteristics of non-layered control disks. The composition of the control disks was a blend of sodium azide and cupric oxide in the weight ratio of 61% sodium azide to 39% cupric oxide. The control disks contained no layers comprising iron oxide. The dimensions and weight of the control disks were the same as those of the disks 110 of the present invention. Eight control disks were placed in an inflator which was the same as inflator 10 of FIG. 2. Pressure measurements were taken within the combustion cup 44, and within a tank, affixed to the inflator, as in the above tests of the disks 110. Every aspect of firing the inflator was the same as firing the inflator containing the disks of the present invention.

Figure 6:
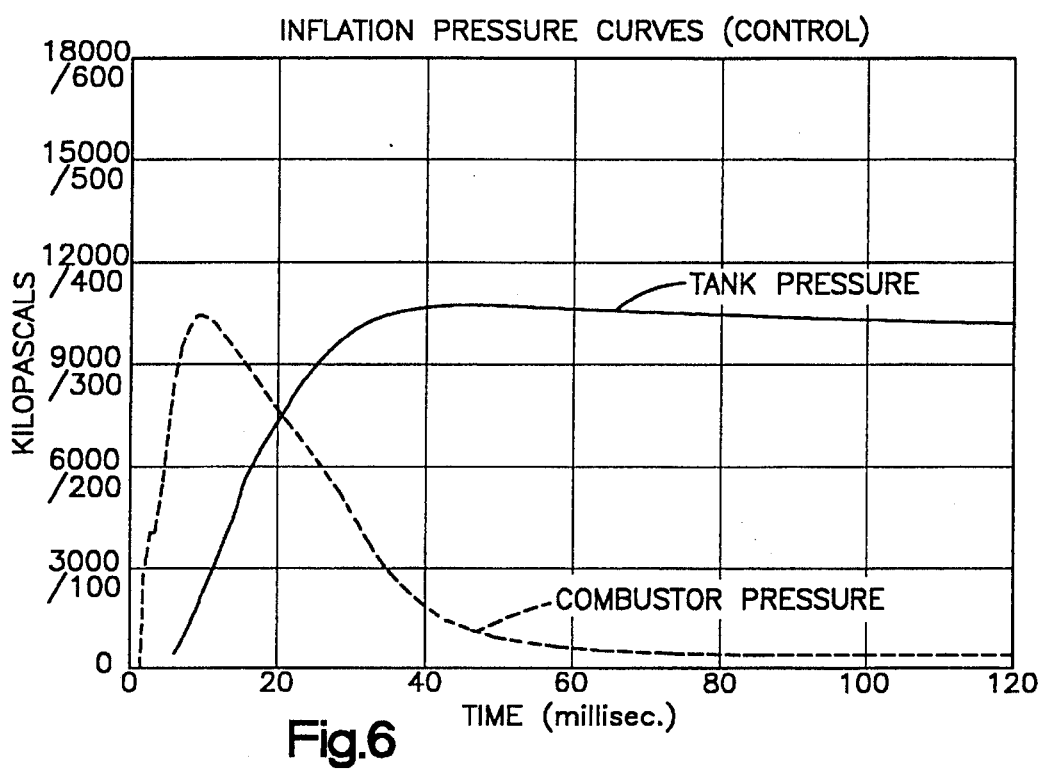
FIG. 6 is a graph showing pressure curves obtained in a comparative test using disks formed of a control composition.

The burn characteristics of the control disks are shown in FIG. 6. FIG. 6 has two curves, a combustor pressure curve (pressure within the combustion cup 44) shown in the dashed line, and a tank pressure curve, shown in the solid line. Referring to the combustor pressure curve, the pressure increased rapidly reaching a peak pressure of about 10,487 kPa at about 8.85 milliseconds burn time. This is a much higher peak pressure than achieved with the test disks of the present invention. Only 6.4 milliseconds burn time elapsed between 1% of the combustor peak pressure and 95% of the combustor peak pressure, compared with 11 milliseconds in this pressure frame for the test disks. This characteristic of the combustor curve is due to the larger amount of fast burning material in the control disks, than in the test disks.

Another distinct difference between the respective combustor pressure curves is that the test disks of the present invention provided a definite step, shown in FIG. 5, after the initial rise, at about 3,000 kPa, and prior to the establishment of combustion of the intermediate layer. This step is not evident in the control combustor pressure curve of FIG. 6.

Referring to FIG. 6, at about 8.85 milliseconds, the escape of gas from the combustion cup exceeded production of gas, so that the combustor pressure declined rapidly, up to about 40 milliseconds, decreasing more gradually from thereon.

This burn characteristic of the control disks is reflected in the tank pressure shown in the solid line in FIG. 6. The disks achieved a peak tank pressure of about 358 kPa in about 45.15 milliseconds, compared to 106.25 milliseconds for the test disks. The slope up to the peak pressure was relatively steep, achieving 95% of peak pressure in about 28.15 milliseconds (compared with 65 milliseconds for the test disks). As shown in FIG. 6, the disks did not generate the S-shaped tank pressure curve which was evident in FIG. 5. The following Table 2 gives specific tank pressures at specific burn times, for the control disks:

TABLE 2

| Milliseconds | Tank Pressure kPa |
| --- | --- |
| 5 | 12.4 |
| 10 | 89.6 |
| 20 | 247.9 |
| 30 | 333.8 |
| 40 | 355.9 |
| 50 | 357.4 |
| 60 | 354.9 |
| 70 | 351.6 |

The control disks provided a maximum tank gas temperature of about 400.41° F, compared with 383° F. for the test disks.

Advantages of the present invention should be apparent. The layering of the different metal oxide/sodium azide compositions, within a given configuration, permits tailoring the combustion burn time and generation of gas to the overall characteristic desired. In this Example, the layering provided an S-shaped tank pressure curve in which the tank pressure initially increased at a slow rate, then at a more rapid rate, ending with a slower rate increase to a maximum pressure. This S-shaped tank pressure curve was not attainable with the single layered control disks.

This would mean that in the case of deployment of an air bag, the bag would be deployed more slowly at first, than with the control disks, and that the deployment would then accelerate, but still at a more gentle rate. Moreover, the test disks of this Example provided a greater gas output than the control disks, an advantage of the present invention. The stoichiometric ratio of sodium azide to metal oxide is larger when iron oxide is used than when cupric oxide is used. This means that the sodium azide/iron oxide blend will have more sodium azide than the blend of sodium azide with cupric oxide. This results in the production of more nitrogen gas or, conversely, deployment of an air bag with less gas generating material. At the same time, the benefit of having some fast burning material (cupric oxide) in the grains is present.

In this respect, it is known that a blend of sodium azide with iron oxide is more difficult to burn than a blend of sodium azide with cupric oxide. Burning a blend of sodium azide with iron oxide usually requires a burn rate enhancer. Such a burn rate enhancer can be a coating. An advantage of using a layer of cupric oxide/sodium azide blend, in accordance with the present invention, over the use of a coating, is the ability to control the burn characteristics of the disk to closer tolerances. In a coating process, the coating materials can migrate to the grain and, conversely, grain material can migrate to the coating. In addition, the thickness of any coating adhered to a grain is difficult to control to close tolerances. In contrast, in the present invention, the thickness of the layers of gas generating material can be closely controlled. No migration of grain material from one layer to another occurs. This results in control of the burn characteristics to closer tolerances.

In the present invention, it is possible to refine the burn rate characteristics further by changing (a) the particle sizes of the respective components, or (b) the relative volumes of the respective layers, or (c) the relative percents of gas generating material of each type employed. By decreasing the particle size of either the metal oxide or the sodium azide, the burn rate can be increased. By increasing the particle size of either the metal oxide or the sodium azide, the burn rate can be decreased. This technique can be employed with either the fast-burning composition or the slow-burning composition. In fact, this technique could be used to create both a fast-burning composition and a slow-burning composition from two blends of the same azide and oxidizer. Similarly, changing the relative percentages of gas generating material of each type employed will vary the burn rate characteristics. For instance, the characteristic combustor pressure step in FIG. 5, at about 3,000 kPa, can be raised or lowered by increasing or decreasing, respectively, the relative volumes of the sodium azide/cupric oxide layers, delaying or speeding up the pressurization of the tank, in the present Example, or deployment of an air bag in an air bag apparatus.

EXAMPLE 2

This Example shows that deployment of an air bag following an S-shaped tank pressure curve can be obtained by using only two layers of gas generating material wherein one layer is fast burning and the other is slow burning.

This Example involves disks 110' shown in FIGS. 7 and 8 and which comprise only two layers, a top layer 180 and a bottom layer 182. The top layer 180 has a thickness of about 2.4 mm, and the bottom layer 182 has a thickness of about 0.6 mm, for an overall disk thickness (including the raised areas) of about 3.3 mm. Other dimensions of the disks are the same as those of Example 1. The top or thicker layer 180 is comprised, in this instance, of faster burning material, i.e., cupric oxide and sodium azide, and the bottom or thinner layer 182 is comprised of slower burning material, i.e., iron oxide and sodium azide. More specifically, the top layer 180 comprises a 61:39 blend of sodium azide and cupric oxide, and the bottom layer 182 comprises a 68:32 blend of sodium azide and iron oxide ($Fe_2O_3$), the same blends as used in Example 1.

The thickness of the layer of slow-burning material should be at least a fourth of the thickness of the layer of fast-burning material. The thickness of one layer to the other can vary in the range of 20:80 to 80:20.

Figure 9:
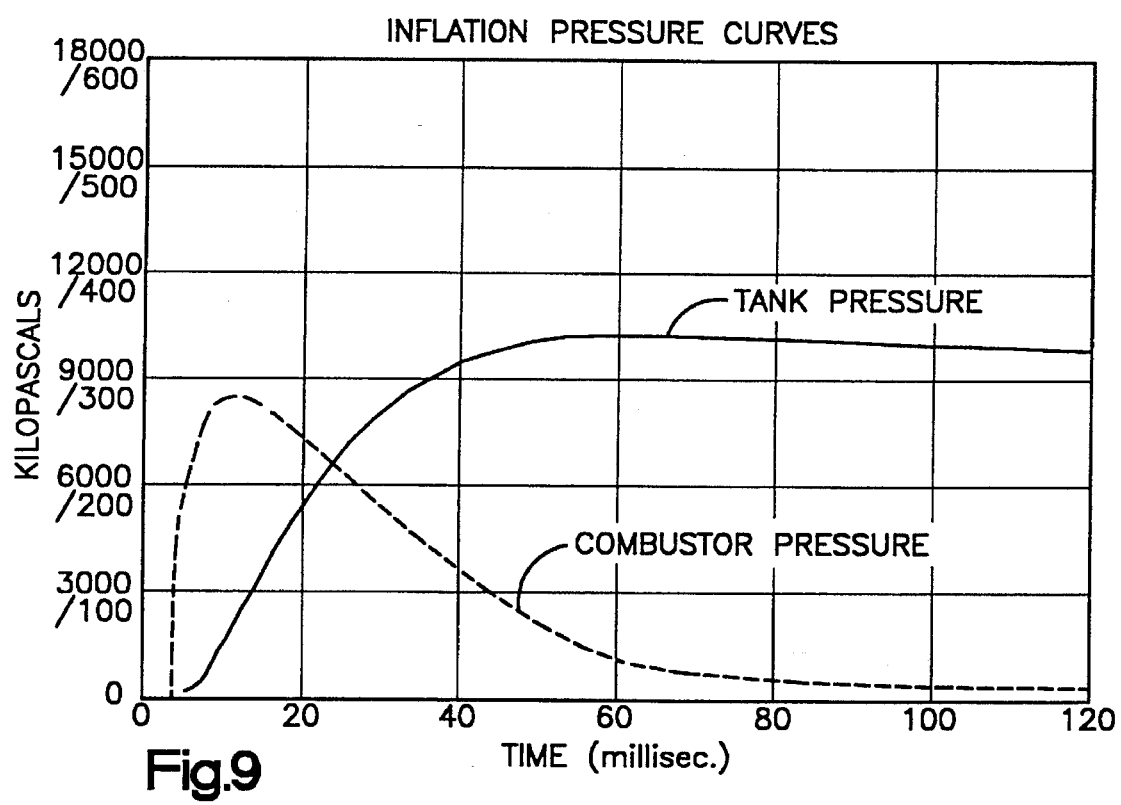
FIG. 9 a graph showing pressure curves obtained in a test using the disks of gas generating material of FIG. 7.

The disks 110' were tested following the same procedure as in Example 1. The burn characteristics of the disks of FIGS. 7 and 8 are shown in FIG. 9. Referring to FIG. 9, the combustor pressure reached a peak of about 8,481 kPa at about 11.25 milliseconds. The combustion was rapid as with the control disk requiring only 5.25 milliseconds elapsed time between 1% of the combustor peak pressure and 95% of the combustor peak pressure. For the control disks, this value was 6.4 milliseconds. For the test disks of Example 1, this value was 11 milliseconds. However, because the disks of this Example contained a lesser amount of the sodium azide/cupric oxide composition than the control disks of FIG. 6, the combustor peak pressure was less than that achieved with the control disks. Also, referring to FIG. 9, the combustor pressure declined, following peak pressure, at a slower rate, than the control disks of FIG. 6. This was due to the layer of the sodium azide/iron oxide blend.

These characteristics in the combustor curve are reflected in the tank pressure curve in FIG. 9. The tank pressure had a peak of about 341 kPa at about 62.85 milliseconds. The pressure variation was as follows:

TABLE 3

| Elapsed Time | Tank Pressure kPa |
|---|---|
| 5 | 7.4 |
| 10 | 58.2 |
| 20 | 188.6 |
| 30 | 272.1 |
| 40 | 318.6 |
| 50 | 337.4 |
| 60 | 340.8 |
| 70 | 339.9 |

The initial 1% pressure rise required about 4.3 milliseconds and was at a gentle slope. The rise from 1% to 95% pressure was achieved in 38 milliseconds and was at a steeper slope than initially.

After 38 milliseconds, the slope tapered off, giving an overall S-shaped tank pressure curve as shown in FIG. 9. The tank pressure curve had a slope between 8.1 milliseconds to 18.1 milliseconds of about 13.55 kPa/ms. This was more gentle than with the control disks, which was about 18.24 kPa/ms between 6.45 milliseconds and 16.45 milliseconds, but less gentle than with the double sided test disks of FIGS. 3 and 4, which was about 6.97 kPa/ms between about 20.8 to 30.8 ms. The area under the curve (0 to 95% peak pressure) was 7,465.28 (kPa times ms) in FIG. 9, compared to 5,456.71 (kPa times ms) for the control in FIG. 6.

The maximum tank gas temperature was about 328.94° F.

This Example thus further illustrates the ability to fine tune the burn characteristics of gas generating disks by layering the disks with fast burning and slow burning gas generating material. The present invention also allows simplification of the gas generating formulations in that blending of only two ingredients for any layer is necessary. In prior art compositions, complex formulating often was employed. For instance, one method currently employed is to add a burn inhibitor or enhancer directly into the gas generating material, thus requiring at least three ingredients. In addition to complicating blending, when a burn enhancer is added to a gas generating material, it generally causes the mix to become more sensitive and more difficult to press. When a burn inhibitor is added to the gas generating material, the mix generally becomes difficult to press, and the resultant disk is more difficult to ignite.

By forming the body of gas generating material by pressing one layer of granular material against another, manufacture to more precise specification is achieved compared to prior art methods of coating such as by dipping and spraying.

Also, the present invention avoids, as mentioned above, the time-consuming drying or curing steps necessary in connection with use of grain coatings.

The present invention also permits use of a metal oxide, which when burned, becomes molten and difficult to filter from the combustion gas. Cupric oxide is an example of such a metal oxide. In the present invention, the iron oxide remains in a sintered state after burning, and the cupric oxide, with a lower melting point, plates onto the sintered material. Another advantage of the present invention is that all of the ingredients in the disk are nitrogen gas producing ingredients, optimizing the amount of nitrogen gas which is produced.

From the above description of the invention, those skilled in the art will perceive improvements, changes and modifications. Such improvements, changes and modifications within the skill of the art are intended to be covered by the appended claims.

Having described the invention, the following is claimed:

1. A body of material which is ignitable to generate a gas for inflating an air bag comprising:

three contiguous layers of particulate gas generating material, the intermediate layer of said layers comprising a particulate nitrogen generating composition which is easily ignited and burns rapidly; and the outer two layers of said layers comprising a particulate nitrogen generating composition which is less easily ignited than said intermediate layer and burns more slowly than said intermediate layer wherein said body is cylindrical in configuration and said layers being pressed together, the layers extending transverse to the axis of said cylindrical configuration; and wherein the thickness of one of said layers relative to any other layer is in the range of 20:80 to 80:20.

2. The body of claim 1 in which each of said layers of gas generating material comprises an azide and an oxidizer.

3. The body of claim 2 in which said azide is an alkali metal azide and the oxidizer in each of said layers is a metal oxide, the metal oxide of said intermediate layer being cupric oxide, and the metal oxide of said outer layers being iron oxide.

4. The body of claim 1 in the form of disks.

5. The body of claim 1 in the form of pellets.

6. A body of material which is ignitable to generate a gas for inflating an air bag comprising:

at least two contiguous layers of particulate gas generating material, each of said layers having opposed, distinct surfaces;

one of said layers comprising a particulate nitrogen generating composition which is easily ignited and burns rapidly; and a second of said layers comprising a particulate nitrogen generating composition which is less easily ignited than said first layer and burns more slowly than said first layer, said body being cylindrical in configuration and having a longitudinal axis which intersects each of said layers;

each of said layers having a thickness sufficient for the layer to contribute to the sustained burn of the body of material, the thickness of said one layer relative to the thickness of any other layer being in the range of 20:80 to 80:20.

7. The body of claim 6 in which each of said layers of gas generating material comprises an azide and an oxidizer, said layers being pressed together.

8. The body of claim 7 in which said azide is an alkali metal azide and said oxidizer of said one of said layers is a different oxidizer from the oxidizer in said second of said layers.

9. The body of claim 8 in which said azide is an alkali metal azide and the oxidizer in each of said layers is a metal oxide, the metal oxide of said one of said layers being cupric oxide, and the metal oxide of said second of said layers being iron oxide.

10. The body of claim 9 comprising three layers, wherein the intermediate layer is made of a faster burning material than the outer layers.

11. The body of claim 6 in the form of disks.

12. The body of claim 6 in the form of pellets.

13. A body of material which is ignitable to generate a gas for inflating an air bag comprising:

at least two contiguous layers of particulate gas generating material, each of said layers having opposed, distinct surfaces;

one of said layers comprising a particulate nitrogen generating composition which is easily ignited and burns rapidly; and a second of said layers comprising a particulate nitrogen generating composition which is less easily ignited than said first layer and burns more slowly than said first layer;

in which the slower burning composition forms a sinter on burning, and the faster burning composition forms a molten metal on burning, the molten metal plating on the sinter of the slower burning composition on burning.

14. The body of claim 13 in which each of said layers of gas generating material comprises an azide and a metal oxide, the metal oxide of the faster burning layer being cupric oxide, and the metal oxide of the slower burning layer being iron oxide.

15. The body of claim 14 comprising three layers, wherein the intermediate layer is a layer of faster burning composition than the outer layers.

16. The body of claim 15 being cylindrical in configuration and comprising a plurality of layers pressed together, the layers extending transverse to the axis of said cylindrical configuration.

17. The body of claim 16 in the form of disks.

18. The body of claim 16 in the form of pellets.

19. An apparatus for protecting a vehicle occupant during a collision comprising:

an air bag;

means for inflating said air bag including at least one body of gas generating material which is ignitable to generate a gas for inflating said air bag, said body comprising:

three contiguous layers of particulate gas generating material, the intermediate layer of said layers comprising a particulate nitrogen generating composition which is easily ignited and burns rapidly; and the outer two layers of said layers comprising a particulate nitrogen generating composition which is less easily ignited than said intermediate layer and burns more slowly than said intermediate layer wherein said body is cylindrical in configuration and said layers being pressed together, the layers extending transverse to the axis of said cylindrical configuration; and wherein the thickness of one of said layers relative to any other layer is in the range of 20:80 to 80:20.

20. An apparatus for protecting a vehicle occupant during a collision, said apparatus comprising:

an air bag;

means for inflating said air bag including at least one body of gas generating material which is ignitable to generate a gas for inflating said air bag, said body comprising:

at least two contiguous layers of particulate gas generating material, each of said layers having opposed, distinct surfaces, one of said layers comprising a particulate nitrogen generating composition which is easily ignited and burns rapidly, and a second of said layers comprising a particulate nitrogen generating composition which is less easily ignited than said first layer and burns more slowly than said first layer, said body being cylindrical in configuration and having a longitudinal axis which intersects each of said layers, each of said layers having a thickness sufficient for the layer to contribute to the sustained burn of the body of material, the thickness of said one layer relative to the thickness of any other layer being in the range of 20:80 to 80:20.

21. An apparatus for protecting a vehicle occupant during a collision, said apparatus comprising:

an air bag;

means for inflating said air bag including at least one body of gas generating material which is ignitable to generate a gas for inflating said air bag, said body comprising:

at least two contiguous layers of particulate gas generating material, each of said layers having opposed, distinct surfaces, one of said layers comprising a particulate nitrogen generating composition which is easily ignited and burns rapidly, and a second of said layers comprising a particulate nitrogen generating composition which is less easily ignited than said first layer and burns more slowly than said first layer, in which the slower burning composition forms a sinter on burning, and the faster burning composition forms a molten metal on burning, the molten metal plating on the sinter of the slower burning composition on burning.

22. A body of material which is ignitable to generate a gas for inflating an air bag comprising:

at least two contiguous layers of particulate gas generating material, each of said layers having opposed, distinct surfaces;

one of said layers comprising a particulate nitrogen generating composition which is easily ignited and burns rapidly; and a second of said layers comprising a particulate nitrogen generating composition which is less easily ignited than said first layer and burns more slowly than said first layer, said body being cylindrical in configuration and having a longitudinal axis which intersects each of said layers;

each of said layers having a thickness sufficient for the layer to contribute to the sustained burn of the body of material and effective to generate an S-shaped tank pressure curve and wherein the thickness of one of said layers relative to any other layer is in the range or 20:80 to 80:20.

* * * * *